United States Patent Office 3,355,422
Patented Nov. 28, 1967

3,355,422
STABILIZED POLYESTER-BASED POLY-
URETHANE COMPOSITION
Gordon D. Brindell, Wayne, N.J., assignor to United States Rubber Company, New York, N.Y., a corporation of New Jersey
No Drawing. Filed Nov. 23, 1964, Ser. No. 413,341
5 Claims. (Cl. 260—45.85)

ABSTRACT OF THE DISCLOSURE

Polyester-based polyurethane, in such forms as fibers (spandex), films or coatings, is stabilized against sunlight and gas fumes by a synergistic combination of (1) a 2,5-dialkyl hydroquinone such as 2,5-di-tert-butylhydroquinone, (2) an aromatic phosphite such as tris(nonylphenyl) phosphite, and (3) either an hydroxyarylbenzotriazole such as 2-(2'-hydroxyphenyl-5-ethyl) benzotriazole or a thiodipropionic compound such as dilauryl thiodipropionate.

---

This invention relates to the stabilization of polyester-based polyurethanes by means of a synergistic combination of (1) A 2,5-dialkyl hydroquinone,
(2) An aromatic phosphite, and
(3) Either (I) a hydroxyarylbenzotriazole, or (II) a thiodiopropionic compound.

The invention is concerned with protection of polyester-based polyurethane compositions in such forms as fibers, films and coatings, against the degradation caused by sunlight and gas combustion fumes. In such applications as those just named, where the surface-to-volume ratio is high, the degradation caused by ultraviolet light and gas fumes may be very damaging. The degradation is exhibited by a decrease in strength of formed articles and as a visual yellowing of the originally light-colored compositions. The yellow is especially apparent in the case of white-pigmented shapes. From the standpoint of consumer acceptance and satisfaction, it is highly desirable that they retain their original whiteness. Through such stabilizer usage as is made possible by the practice of this invention, the named articles are made more suitable for outdoor usage and have a longer storage life without discoloration.

The polyester-based polyurethanes employed in the present invention are well-known materials prepared by reaction of an hydroxy-terminated polyester with an organic polyisocyanate, as described, for example, in U.S. Patent 3,111,369 and the references noted therein, the disclosures of which are incorporated herein by reference. Any of the polyester-based polyurethanes disclosed therein may be employed in this invention, but not the polyether-based polyurethanes, which are inoperative in the invention.

The stabilized polyester-polyurethane compositions of my invention comprise, based on the weight of the polyurethane, (1) from about 0.1 to 5% of a 2,5-dialkylhydroquinone having the formula

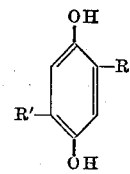

wherein R and R' are the same or different alkyl radicals, (2) from about 0.1 to 5% of an aromatic phosphite having the formula

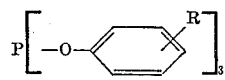

where R is H or an alkyl group, and (3) from about 0.1 to 5% of a chemical selected from the group consisting of (I) hydroxyarylbenzotriazoles of the general structure

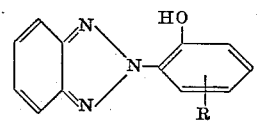

wherein R is an alkyl group, and (II) a thiodipropionate having the formula $$S(-CH_2CH_2COOR)_2$$

where R is H or an alkyl radical.

Representative examples of the alkylated hydroquinones which may be used in the practice of this invention are 2,5 - di-tert-butylhydroquinone, 2,5-di-tert-amylhydroquinone, 2,5-dimethylhydroquinone, 2,5-di-tert-octylhydroquinone.

Examples of the aromatic phosphites are triphenyl phosphite, tricresyl phosphite, tris(nonylphenyl) phosphite, and tris(dodecylphenyl) phosphite.

An example of a hydroxyarylbenzotriazole is 2(2-hydroxy-5-methylphenyl)benzotriazole.

Examples of thiodipropionates are thiodipropionic acid, dilauryl thiodipropionate, distearyl thiodipropionate, and dioctyl thiodipropionate.

The chemical additives employed in the invention are all remarkably non-discoloring materials, i.e., they most surprisingly undergo very little discoloration on long exposure to ultraviolet radiation. In addition to this, the hydroxyarylbenzotriazoles employed in one form of the invention have very light colors, compared, for example, with the undesirable hydroxybenzophenone type ultraviolet absorbers, so that greater quantities of them can be used to achieve a desired degree of protection with much less effect on the initial color of the polyurethane article.

I have found that the three components of my combination of additive chemicals act together synergistically and bring about a surprising degree of protection against ultraviolet degradation. Some of the component parts of my stabilizer systems, viz., the 2,5-di-tert-butylhydroquinone, or 2,5-di-tert-amylhydroquinone, or triphenylphosphite, or a hydroxyarylbenzotriazole, when used alone, are only able to impart a limited and unsatisfactory degree of light protection; the same is true when such components as, for example, the 2,5-di-tert-butylhydroquinone and a hydroxyarylbenzotriazole, are used in combination. Using dilauryl thiodipropionate alone even gives a very marked worsening of the discoloration compared to a control sample without it. In contrast to the foregoing, my conjoint use of all three components as defined gives a degree of protection which is not possible to achieve with any protectants used one or two at a time. This point is more fully illustrated in the examples later described.

The present invention differs from the use of a binary mixture of 2,5-di-tert-amylhydroquinone and triphenyl phosphite in that unexpectedly improved results are obtained with the herein described ternary mixtures. My discovery of the special efficacy of a particular ultraviolet-screening component in the present combination is not at all obvious, for ultraviolet-screening materials, as a class, are not effective in my invention.

The chemicals to be used in my invention are conveniently added to the polyester based polyurethane polymer while the polymer is in a fluid state by conventional methods of agitation. The polymer may then be chain extended and/or cross linked in the normal manner (using, for example, such reagents as water, organic diamines, aliphatic polyols, hydrazine, and the like). In the manufacture of elastic thread, for example, the chain extension step may coincide with the spinning of the thread. Alternatively, the protective agents may be added after the polymer has been chain-extended, for example, by adding the chemicals to a solution of the chain extended polymer. For elastomeric stocks, the chemicals may be added to partially chain-extended materials by milling. The curatives are then added on the mill and curing completed at the processing temperature.

The following examples, in which all quantities are expressed by weight, will serve to illustrate the practice of the invention in more detail. In the examples artificial light aging was done in an enclosed carbon-arc type of apparatus (FDA-R-FO-3743 Fade-Ometer) operated according to ASTM Procedure E–188, Method A. Gas fading tests were run according to AATCC Method 23–1957. Gas fading cycles were judged by comparing the exposed control sample with the standard of fading.

*Example 1*

This example demonstrates the improved resistance to discoloration by ultraviolet to be achieved through the use of a three-component additive combination of the invention, over that of a two-component system.

A polyester having a molecular weight of about 2100 and an acid value of about 0.7 is prepared by condensing an approximately 70/30 mixture of ethylene glycol and 1,2-propylene glycol with adipic acid, the glycol being used in slight molar excess to insure hydroxyl terminal groups. About ten percent of titanium dioxide is dispersed into the polyester, for purposes of pigmentation, by paint-milling. About 2310 parts (1 mole) of the polyester, containing titanium dioxide, is heated at 55° C. in a glass-lined vessel, provided with a mechanical stirrer, a dry nitrogen inlet tube, a condenser and a thermometer. About 500 parts (2 moles) of p,p'-diphenylmethane diisocyanate is added to the polyester and the mixture is heated to about 120° C. Heating is continued at this temperature for about 2 hours. A blanket of dry nitrogen over the reaction mixture keeps out atmospheric moisture. The resulting polyurethane prepolymer is of white color and has a Brookfield viscosity of about 9500 poises at 85° F.

To make films for testing, a polyester prepolymer of the foregoing kind is made more fluid by warming, weighed amounts of additive chemicals shown in Table I below are put in and mixed thoroughly, and films of 20 mils thickness are spread on clean glass plates. The polymer is allowed to cure in a covered tray containing some water in the bottom to make a humid atmosphere. The films achieve a cure in one or two days in this environment. Strips of the cured films ½ inch wide and of convenient length are used for testing. In Table I, the amounts of additives are expressed as parts per 100 parts of the prepolymer composition. Table I shows the results of color stability tests.

TABLE I.—COLOR STABILITY TEST

| Composition | Sample No. | | | | |
|---|---|---|---|---|---|
| | 1 | 2 | 3 | 4 | 5 |
| | Amounts | | | | |
| Additives: | | | | | |
| 2,5-di-tert-amyl hydroquinone | 0.5 | 0.5 | 0.5 | 0.5 | 0 |
| Triphenyl phosphite | 0.5 | 0.5 | 0.5 | 0.5 | 0 |
| 2-(2'-hydroxyphenyl-5-alkyl) benzotriazole [1] | 0.25 | 0.5 | 1.0 | 0 | 0 |
| | UV Fade-Ometer Rating | | | | |
| Aging Test—Exposure period (hours): | | | | | |
| 24 | 5 | 5 | 5 | 5 | 2 0 |
| 48 | 4 | 4 | 4 | 4 | |
| 72 | 3 | 3 | 3 | 1 | |
| 96 | 1 | 2 | 3 | 7 | |

[1] E.g., 2-(2'-hydroxyphenyl-5-ethyl)benzotriazole or equivalent material.
[2] The control strip with no additives has a discoloration rating of 1 ("extreme") in 4 hours and of zero ("very extreme") upon longer exposures.

The rating scale for color changes is as follows:
5—none; 4—very slight; 3—slight; 2—definite; 1—extreme; 0—very extreme.

The above example demonstrates that the addition of even as little as one-fourth part of the hydroxyarylbenzotriazole (sample 1), improves the light resistance of the polyester polyurethane film, especially on extended exposure, over and above the protection afforded by the two-component system (sample 4). The example also demonstrates that increasing the amount of the hydroxyarylbenzotriazole chemical improves the resistance even more.

*Example 2*

This example will demonstrate the synergistic behavior of dilauryl thiodipropionate (DLTDP) in combination with the alkyl-substituted hydroquinone and phosphite. It will show improved light protection over the best previous two-component additive system.

Polyurethane films were prepared by the procedure set forth in Example 1. The cured films were tested in the Fade-Ometer and given one cycle of gas fading with appropriate control samples.

In the following Table II, the symbols +, 0, and — are used to designate discoloration of the test piece versus that of the control sample. The control sample consists of 2,5-di-tert-amylhydroquinone (0.5)+triphenyl phosphite (0.5)

+ means less discoloration than control
0 means same discoloration as control
— means more discoloration than control.

A number used with symbols designates degree of discoloration. For example, 3— denotes more discoloration than 2—.

TABLE II

| Composition | Sample No. | | | | | | | |
|---|---|---|---|---|---|---|---|---|
| | 1 | 2 | 3 | 4 | 5 | 6 | 7 | 8 |
| | Amounts | | | | | | | |
| Additives: | | | | | | | | |
| 2,5-di-tert-amylhydroquinone | 0.5 | | | | | 0.5 | 0.5 | 0.5 |
| Triphenyl phosphite | | 0.5 | | | 0.5 | | 0.5 | 0.5 |
| DLTDP [1] | | | 1.0 | 1.8 | 0.83 | 1.0 | 1.0 | 1.8 |
| | UV Fade-Ometer Rating | | | | | | | |
| Aging Tests: | | | | | | | | |
| Exposure period, 24 hrs | | 2 | [2]2 | [2]3 | 2 | ([3]) | 0 | 0 |
| | Gas Fading Test | | | | | | | |
| Exposure period, 1 cycle | 0 | | | | | 0 | 0 | 0 |

[1] DLTDP stands for dilauryl thiodipropionate.
[2] Discoloration worse than no additive control film.
[3] Spotty discoloration at 16 and 24 hours.

These results allow the conclusions that additives used one at a time (samples 1, 2, and 3) provide less ultraviolet protection than the control sample. Gas fading protection is either the same as (sample 1) or worse than the control sample as shown by samples 2, 3, and 4.

Also, triphenyl phosphite and DLTDP used together (sample 5) and 2,5-di-tert-amylhydroquinone plus DLTDP (sample 6) showed no improvement over the control sample. Apparently DLTDP does not diminish the gas fading protection afforded by 2,5-di-tert-amylhydroquinone as shown by sample 6.

From Table II, the three-component combination of Composition II (samples 7 and 8) appeared to be the equivalent of the control sample for ultraviolet resistance and 1 cycle gas fading. However, when exposures in the UV Fade-Ometer were extended, marked differences began to show up. The proof of this conclusion is given in Table III.

TABLE III

| Composition | Sample No. | | | |
|---|---|---|---|---|
| | 1 | 2 | 3 | 4 |
| | Amounts | | | |
| Additives: | | | | |
| 2,5-di-tert-amylhydroquinone | 0.5 | 0.5 | 0.5 | 0.5 |
| Triphenyl phosphite | | 0.5 | 0.5 | 0.5 |
| DLTDP | 1.0 | 1.0 | 1.8 | |
| | UV Fade-Ometer Rating | | | |
| Aging Test—Exposure period, hrs.: | | | | |
| 24 | 4 | 4 | 4 | 4 |
| 48 | 1 | 4 | 4 | 4 |
| 72 | 0 | 3 | 2 | 1 |
| 96 | 0 | 3 | 2 | 1 |

Thus, the three-component additive system is superior to the control sample, two component mixtures, i.e., 2,5-di-tert-amylhydroquinone plus triphenyl phosphite (sample 4), at extended exposure times. By comparison of sample 2 of this table at 96 hrs. with sample 3 of Example No. 1, it is apparent that equivalent protection can be attained by either the form of the invention based on the hydroxyarylbenzotriazole chemical or the thiodipropionic chemical. There is a high degree of certainty in this statement because both the samples were from the same UV Fade-Ometer run and thus received identical radiation dosages.

*Example 3*

This example illustrates the application of the protective system to thread. In addition it demonstrates that mixtures of DLTDP and 3,3'-thiodipropionic acid are equally effective stabilizers.

For the first part of this example spandex threads were prepared and spun as follows:

Weighed amounts of chemicals to produce the compositions listed in Table IV below were added to the warm polymer contained in a 1-liter, 3-neck, round-bottom flask. The mixture was stirred mechanically under vacuum for ½ hour to degas and accomplish mixing of additives.

The protected mixtures were spun into thread by the usual spinning procedure (as described in Kohrn et al., U.S. 2,953,839, wherein the polyester polyurethane is prepared [see Example I]) from ethylene glycol—propylene glycol—adipic acid polyester and diphenylmethane diisocyanate.

The compositions of the additive system and test results are given below.

TABLE IV

| Composition | Sample No. | | | |
|---|---|---|---|---|
| | 1 | 2 | 3 | 4 |
| | Amounts | | | |
| Additives: | | | | |
| 2,5-di-tert-amylhydroquinone | 0.5 | 0.5 | | 0.5 |
| Tris(nonylphenyl)-phosphite | 0.5 | 1.0 | | |
| Triphenyl phosphite | | | | 0.5 |
| DLTDP | 1.0 | 1.0 | | |
| Pigment | 0.01 | 0.01 | 0.01 | 0.02 |
| | UV Fade-Ometer Rating | | | |
| Aging Test—Exposure period, hrs.: | | | | |
| 4 | 5 | 5 | 2 | 5 |
| 16 | 5 | 5 | 1 | 2 |
| 24 | 4 | 5 | 1 | 1 |
| 48 | 2 | 2 | 0 | 0 |

The thread samples above were given 1 cycle of gas fading exposure. Samples 1 and 2 showed about the same results and were less discolored by the treatment than sample 4 which lacked DLTDP and, thus, further shows the synergistic effect. Of course, the control sample 3, containing only the color additive, was badly discolored.

The thread samples were also given a treatment with 0.5% Clorox (sodium hypochlorite solution) for 30 minutes at 160° F. The threads were thoroughly rinsed in distilled water to remove the Clorox, dried and examined. The threads of samples 1 and 2 were less discolored by the treatment than the thread of sample 4 which was in turn less discolored than sample 3 with no additives.

In the second part of this example another series of spandex threads were spun as described before. The composition of the additive system and the test results are given below.

TABLE V

| Composition | Sample No. | | | | |
|---|---|---|---|---|---|
| | 1 | 2 | 3 | 4 | 5 |
| | Amounts | | | | |
| Additives: | | | | | |
| 2,5-di-tert-butylhydroquinone | 0.5 | 0.5 | 0.5 | 0.5 | |
| 2,5-di-tert-amylhydroquinone | | | | | 0.5 |
| Tris(nonylphenyl)-phosphite | 1.0 | 1.0 | 1.0 | 1.0 | |
| Triphenyl phophite | | | | | 0.5 |
| 3,3'-thiodipropionic acid | | 0.5 | 0.75 | 1.0 | |
| DLTDP | 1.0 | 0.5 | 0.25 | | |
| Pigment | 0.01 | 0.01 | 0.01 | 0.01 | 0.02 |
| UV Fade-Ometer Rating | | | | | |
| Aging Test—Exposure period, hrs.: | | | | | |
| 4 | 5 | 5 | 5 | 5 | 4 |
| 24 | 4 | 5 | 4 | 4 | 1 |
| 48 | 2 | 2 | 2 | 2 | 0 |
| 72 | 1 | 1 | 1 | 1 | 0 |

The threads were given one cycle of gas fading. Sample 3 was the least discolored of the group followed by samples 1 and 2 which were about equivalent followed by sample 4. All three-component samples (1–4) were less discolored than sample 5 which in turn was less discolored than a spandex (no additive) control.

The threads were subsequently given two treatments with .5% Clorox for 30 minutes at 160° F. The threads were rinsed with distilled water between said Clorox cycles as well as following the second cycle. Clorox discoloration increased in the following order:

Sample 3 (least discolored); Sample 2; Sample 1; Sample 4; Sample 5 (no additive control), most discolored.

Thus, this example has demonstrated improved UV resistance in thread applications for the protective system of the invention over that of the best previous 2,5-di-tert-amplhydroquinone plus triphenyl phosphite combination, i.e., Example 4 of Table IV.

The second part of the example shows that mixtures of 3,3'-thiodipropionic acid and its dilauryl ester (DLTDP) are effective stabilizers against UV radiation. In addition they show an advantage in gas fading resistance and Clorox resistance when compared with prior known color stabilizers such as Example 5 of Table V.

Having thus described my invention, what I claim and desire to protect by Letters Patent is:

1. Composition comprising:
   (1) a polyurethane which is a reaction product of a hydroxy-terminated polyester of a glycol and a saturated dicarboxylic acid with an organic diisocyanate,
   (2) a 2,5-dialkyl hydroquinone of the formula

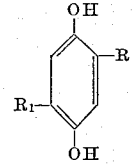

where R and R' are the same or different alkyl radicals,
   (3) an aromatic phosphite of the formula

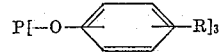

where R has at least one of the values H and an alkyl group, and
   (4) a chemical of the formula

where R is H or an alkyl radical.

2. Composition as in claim 1 in which (4) is thiodipropionic acid.

3. Composition as in claim 1 in which (4) is dilauryl thiodipropionate.

4. Composition comprising:
   (1) a polyurethane which is a reaction product of a hydroxy-terminated polyester of a glycol and a saturated dicarboxylic acid with an organic diisocyanate,
   (2) 2,5-di-tert-amylhydroquinone,
   (3) triphenyl phosphite, and
   (4) dilauryl thiodipropionate.

5. Composition comprising:
   (1) a polyurethane which is a reaction product of a hydroxy-terminated polyester of a glycol and a saturated dicarboxylic acid with an organic diisocyanate,
   (2) 2,5-di-tert-butylhydroquinone,
   (3) tris(nonylphenyl) phosphite, and
   (4) thiodipropionic acid.

References Cited

UNITED STATES PATENTS

| | | | |
|---|---|---|---|
| 2,915,496 | 12/1959 | Swart et al. | 260—45.7 |
| 2,984,645 | 5/1961 | Hoeschele | 260—45.8 |
| 3,239,474 | 3/1966 | Cwik | 260—45.95 X |
| 3,213,058 | 10/1965 | Boyle et al. | 260—45.8 |

DONALD E. CZAJA, *Primary Examiner.*

M. J. WELSH, *Assistant Examiner.*

UNITED STATES PATENT OFFICE

CERTIFICATE OF CORRECTION

Patent No. 3,355,422                            November 28, 1967

Gordon D. Brindell

It is hereby certified that error appears in the above numbered patent requiring correction and that the said Letters Patent should read as corrected below.

In the heading to the printed specification, lines 4 and 5, for "United States Rubber Company, New York, N. Y." read -- Uniroyal, Inc. --.

Signed and sealed this 25th day of February 1969.

(SEAL)
Attest:

Edward M. Fletcher, Jr.                                         EDWARD J. BRENNER Attesting Officer                                                   Commissioner of Patents